(12) United States Patent
Ootsuka et al.

(10) Patent No.: US 9,508,968 B2
(45) Date of Patent: Nov. 29, 2016

(54) METHOD AND APPARATUS FOR MANUFACTURING A BATTERY SAFETY VALVE, A BATTERY SAFETY VALVE, AND METHOD FOR MANUFACTURING A BATTERY CASE LID

(75) Inventors: Masato Ootsuka, Osaka (JP); Shigeru Morikawa, Hiroshima (JP)

(73) Assignee: NISSHIN STEEL CO., LTD. (JP)

( * ) Notice: Subject to any disclaimer, the term of this patent is extended or adjusted under 35 U.S.C. 154(b) by 97 days.

(21) Appl. No.: 14/007,342

(22) PCT Filed: Mar. 13, 2012

(86) PCT No.: PCT/JP2012/056419
§ 371 (c)(1),
(2), (4) Date: Sep. 25, 2013

(87) PCT Pub. No.: WO2012/132879
PCT Pub. Date: Oct. 4, 2012

(65) Prior Publication Data
US 2014/0017524 A1 Jan. 16, 2014

(30) Foreign Application Priority Data
Mar. 31, 2011 (JP) .................. 2011-077913

(51) Int. Cl.
*H01M 2/12* (2006.01)
*B21D 51/38* (2006.01)

(52) U.S. Cl.
CPC ............. *H01M 2/12* (2013.01); *B21D 51/383* (2013.01); *H01M 2/1241* (2013.01)

(58) Field of Classification Search
None
See application file for complete search history.

(56) References Cited

U.S. PATENT DOCUMENTS

| 1,558,419 | A | 10/1925 | White |
| 3,195,769 | A | 7/1965 | Miller |

FOREIGN PATENT DOCUMENTS

| JP | H01-309252 A | 12/1989 |
| JP | H11-204093 A | 7/1999 |
| JP | H11-250885 A | 9/1999 |
| JP | H11-273640 A | 10/1999 |
| JP | 2001-102023 A | 4/2001 |
| JP | 2001-246425 A | 9/2001 |
| JP | 2007-141518 A | 6/2007 |

OTHER PUBLICATIONS

International Search Report from the International Bureau of WIPO for International Application No. PCT/JP2012/056419 dated Jun. 5, 2012 (4 pages).
Extended European Search Report dated Jan. 16, 2015 for European Patent Application No. 12765527.2.

*Primary Examiner* — Patrick Ryan
*Assistant Examiner* — Wyatt McConnell
(74) *Attorney, Agent, or Firm* — Fitch Even Tabin & Flannery LLP

(57) ABSTRACT

In a method for manufacturing a battery safety valve according to the present invention, a stainless steel metal sheet is used, and an thin annular portion constituting an edge portion of a safety valve is formed in a lid by simultaneously pressing annular projecting portions provided respectively on a punch and a die so as to oppose each other, against respective surfaces of the lid.

10 Claims, 6 Drawing Sheets

METHOD AND APPARATUS FOR MANUFACTURING A BATTERY SAFETY VALVE, A BATTERY SAFETY VALVE, AND METHOD FOR MANUFACTURING A BATTERY CASE LID

CROSS-REFERENCE TO RELATED APPLICATIONS

This application is a U.S. national phase application filed under 35 U.S.C. §371 of International Application PCT/JP2012/056419, filed on Mar. 13, 2012, designating the United States, which claims priority from Japanese Patent Application No. 2011-077913, filed Mar. 31, 2011, which are hereby incorporated herein by reference in their entirety.

TECHNICAL FIELD

The present invention relates to a method for manufacturing a battery safety valve, an apparatus for manufacturing a battery safety valve, a battery safety valve, and a method for manufacturing a battery case lid, and more particularly to a novel improvement in which a stainless steel metal sheet is used and a thin annular portion constituting an edge portion of a safety valve is formed on the metal sheet by simultaneously pressing annular projecting portions provided on a punch and a die so as to oppose each other against respective surfaces of the metal sheet, with the result that the thin annular portion can be molded precisely, and the working load generated during formation of the thin annular portion can be dispersed between the punch and the die, enabling an increase in the lifespan of the die assembly.

BACKGROUND ART

A battery housing an electrolyte in an enclosed battery case is typically provided with a safety valve that ruptures when the internal pressure of the battery case exceeds a predetermined value so that the internal pressure of the battery case is released to the outside in order to prevent the battery from exploding due to an increase in internal pressure of the battery case. A method disclosed in Japanese Patent Application Publication No. 2007-141518 A and so on, for example, may be cited as a conventionally employed method of manufacturing battery safety valve of this type.

In this conventional method, a thin annular portion constituting an edge portion of a safety valve is formed on a metal sheet serving as a lid of a battery case by disposing the metal sheet between an engraving punch having an annular projecting portion and a planar die, and pressing the annular projecting portion of the engraving punch against the metal sheet while supporting the metal sheet using the planar die. When the internal pressure of the battery case exceeds a predetermined value, the thin annular portion, which is formed to be thinner than other parts, splits such that the entire safety valve ruptures.

As described above, the thin annular portion is the part that is intended to split first when the internal pressure of the battery case exceeds a predetermined value, and therefore the thickness thereof is reduced to approximately 0.010 mm, for example. In other words, the punch and the die used to form the thin annular portion are processed extremely finely.

In the conventional method for manufacturing a battery safety valve described above, the thin annular portion is formed on the metal sheet by pressing the annular projecting portion of the engraving punch against the metal sheet while supporting the metal sheet using the planar die, and therefore the thin annular portion is essentially formed by deforming the metal sheet using only the annular projecting portion of the engraving punch.

A soft metal such as aluminum is conventionally used for the metal sheet on which the safety valve is molded. Recently, however, the use of stainless steel has been proposed with a view to improving the corrosion resistance and strength of the battery case.

When the metal sheet is made of aluminum, the thin annular portion can be processed precisely due to the softness of the metal. Moreover, since the load exerted on the die assembly is small, processing can be performed without problems. Stainless steel, on the other hand, is a hard material having great strength, and therefore, when an attempt is made to process the thin annular portion of the safety valve using the conventional method, cracks are more likely to appear during the processing. Further, the thin portion cannot be processed precisely due to work hardening.

Furthermore, with the conventional method, the load generated during formation of the thin annular portion is concentrated on the annular projecting portion of the engraving punch, leading to a reduction in the lifespan of the die assembly.

SUMMARY OF THE INVENTION

The present invention has been designed to solve the problems described above, and an object thereof is to provide a method for manufacturing a battery safety valve, an apparatus for manufacturing a battery safety valve, a battery safety valve, and a method for manufacturing a battery case lid with which an thin annular portion can be molded precisely, and the working load generated during formation of the thin annular portion can be dispersed between a punch and a die, enabling an increase in the lifespan of the die assembly.

In a method for manufacturing a battery safety valve according to the present invention, a thin annular portion constituting an edge portion of a safety valve is formed in a stainless steel metal sheet constituting a battery case of a battery, by disposing the metal sheet between a punch and a die and pressing annular projecting portions provided respectively on the punch and the die so as to oppose each other against respective surfaces of the metal sheet simultaneously.

An apparatus for manufacturing a battery safety valve according to the present invention includes: a plurality of sets of a punch and a die; a plurality of sets of annular projecting portions that are provided respectively on the punch and the die so as to oppose each other and which have different tip end widths for each punch and die set; and restraining means disposed on an outer peripheral side of the annular projecting portions of the punch and the die, wherein a thin annular portion constituting an edge portion of a safety valve is formed in a stainless steel metal sheet constituting a battery case of a battery, by pressing the annular projecting portions against respective surfaces of the metal sheet simultaneously in descending order of the tip end width while restraining the metal sheet on the outer peripheral side of the annular projecting portions using the restraining means.

A battery safety valve according to the present invention includes: a thin annular portion constituted by a pair of recessed portions that are formed on respective surfaces of a stainless steel metal sheet constituting a battery case of a battery by performing a pressing process in which mutually opposing annular projecting portions are simultaneously pressed against the respective surfaces of the metal sheet; and a bent portion that is provided on an inner peripheral side of the thin annular portion and deformed by an action of the pressing process so as to bend in a sheet thickness direction.

A method for manufacturing a battery case lid according to the present invention is a method of manufacturing a battery case lid that includes a safety valve having an edge portion that is constituted by a thin annular portion, and a side wall portion that stands upright in an annular shape from an outer edge of an outer peripheral side sheet surface positioned on an outer peripheral side of the thin annular portion, and includes: a coining step of forming the thin annular portion on a stainless steel metal sheet serving as a material of the lid by pressing an annular projecting portion against the metal sheet; and a side wall forming step of forming the side wall portion on the metal sheet by implementing a drawing on the metal sheet after the coining step, wherein the thin annular portion is formed in the coining step by simultaneously pressing annular projecting portions disposed to oppose each other, against front and rear surfaces of the metal sheet.

With the method for manufacturing a battery safety valve, apparatus for manufacturing a battery safety valve, a battery safety valve, and method for manufacturing a battery case lid according to the present invention, the thin annular portion constituting the edge portion of the safety valve is formed on the stainless steel metal sheet by simultaneously pressing the annular projecting portions provided respectively on the punch and the die so as to oppose each other against the respective surfaces of the metal sheet. Therefore, the amount of processing applied to the metal sheet by a single annular projecting portion can be reduced, and as a result, the working load exerted on the single annular projecting portion can be reduced. In other words, the appearance of cracks during processing and the occurrence of work hardening can be suppressed, and therefore the thin annular portion can be molded precisely. Moreover, the working load generated during formation of the thin annular portion can be dispersed between the punch and the die, and therefore the lifespan of the die assembly can be lengthened.

DETAILED DESCRIPTION OF THE PREFERRED EMBODIMENTS

Embodiments of the present invention will be described below with reference to the drawings.

First Embodiment

Figure 1:
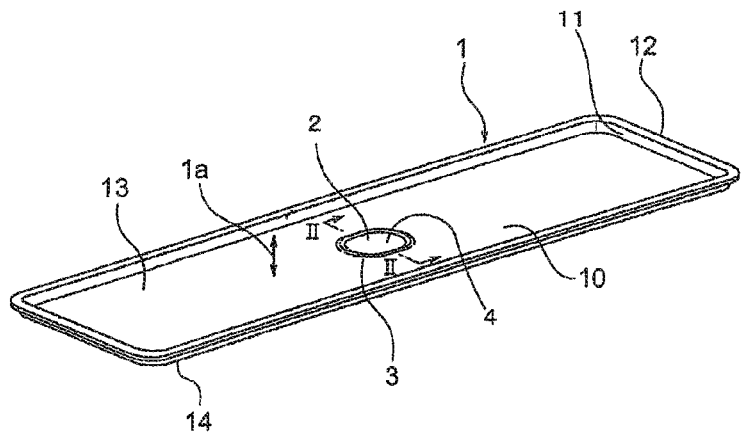
FIG. 1 is a perspective view showing a safety valve of a secondary battery according to a first embodiment of the present invention.

FIG. 1 is a perspective view showing a safety valve 2 of a secondary battery according to a first embodiment of the present invention. In the drawing, a lid 1 is constituted by a stainless steel metal sheet, and constitutes a battery case of the secondary battery. The lid 1 is provided with the safety valve 2 for a secondary battery, which ruptures when an internal pressure of the battery case exceeds a predetermined value so as to release the internal pressure to the outside. The safety valve 2 is provided with a thin annular portion 3 and a bent portion 4.

The thin annular portion 3 is an elliptical groove constituting an edge portion of the safety valve 2, and is formed to be thinner than the remaining sheet surface of the lid 1. The thin annular portion 3 splits first when the internal pressure of the battery case exceeds a predetermined value, thereby causing the entire safety valve 2 to rupture. Note that an outer shape of the thin annular portion 3 may take any form having an enclosed outer edge, for example a circular form, a polygonal form, and so on. The bent portion 4 is a part of the sheet surface positioned on an inner peripheral side of the thin annular portion 3, which is deformed so as to bend in a sheet thickness direction 1a of the lid 1.

A part (to be referred to hereafter as an outer peripheral side sheet surface 10) of the sheet surface of the lid 1 on an outer peripheral side of the thin annular portion 3 is formed to be flat. A side wall portion 11 that stands upright from the outer peripheral side sheet surface 10 in the sheet thickness direction 1a is provided on an outer edge of the outer peripheral side sheet surface 10, and a flange portion 12 is provided on a tip end of the side wall portion 11 so as to bend from the side wall portion 11 substantially at a right angle thereto. Hereafter, an end face of the lid 1 in the standing direction of the side wall portion 11 will be referred to as a front surface 13, and an opposite side end face of the lid 1 will be referred to as a rear surface 14.

Figure 2:
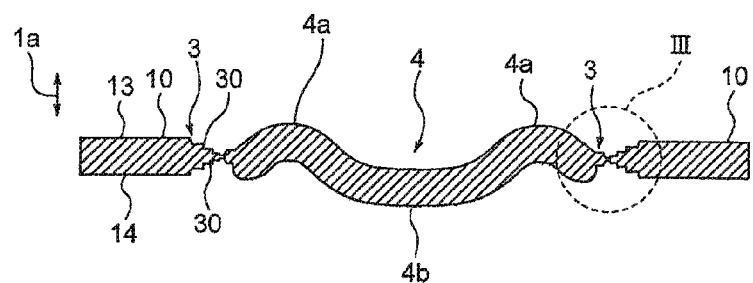
FIG. 2 is a sectional view taken along a line II-II in FIG. 1.
Figure 3:
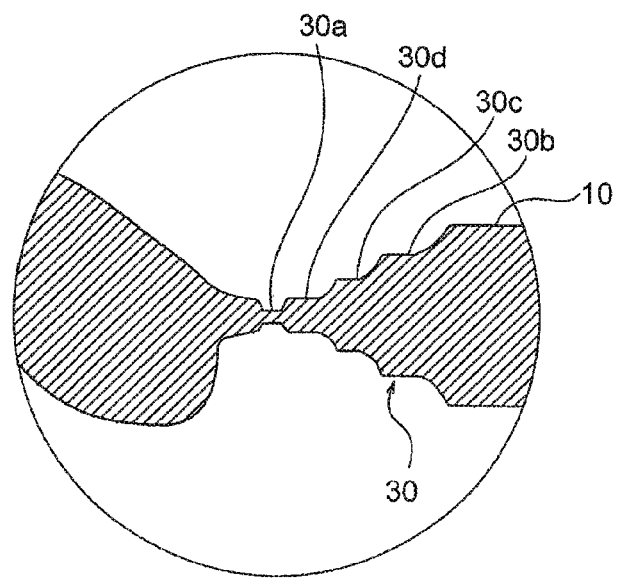
FIG. 3 is an enlarged view of a region III in FIG. 2.

FIG. 2 is a sectional view taken along a line II-II in FIG. 1, and FIG. 3 is an enlarged view of a region III in FIG. 2. As shown in FIG. 2, the thin annular portion 3 is constituted by a pair of recessed portions 30 formed respectively in the front surface 13 and the rear surface 14 of the lid 1. As will be described in more detail below using the drawings, the recessed portions 30 are formed by a pressing process in which mutually opposing annular projecting portions 23 are pressed simultaneously against the respective surfaces of the lid 1 (see FIG. 4).

Looking at the recessed portions 30 in more detail, as shown in FIG. 3, each recessed portion 30 includes a thinnest portion 30a serving as the thinnest part of the thin annular portion 3, and first to third step portions 30b to 30d formed at gradually decreasing thicknesses from the outer peripheral side sheet surface 10 toward the thinnest portion 30a. As will be described in more detail below using the drawings, the thinnest portion 30a and the first to third step portions 30b to 30d are formed by a plurality of coining processes (multistage coining) in which a plurality of sets of the annular projecting portions 23 having different tip end widths are pressed simultaneously against the respective surfaces of the lid 1 in descending order of the tip end width (see (a) to (d) of FIG. 4). By providing the plurality of step portions 30b having gradually decreasing thicknesses from the outer peripheral side sheet surface 10 toward the thinnest portion 30a on the recessed portion 30 in this manner, the position of the thinnest portion 30a can be specified easily, and as a result, efficiency quality inspections for inspecting the thickness of the thin annular portion 3 can be improved.

Returning to FIG. 2, the bent portion 4 is provided with a first projecting portion 4a and a second projecting portion 4b. The first projecting portion 4a projects from the front surface 13 of the lid 1 on the outer peripheral side of the thin annular portion 3 in the sheet thickness direction 1a. The second projecting portion 4b projects from the rear surface 14 of the lid 1 on the outer peripheral side of the thin annular portion 3 in the sheet thickness direction 1a. In other words, the bent portion 4 is deformed to bend in both a front surface direction and a rear surface direction of the lid 1 rather than in only one of the front surface direction and the rear surface direction, and therefore has a wave-shaped cross-section. As will be described in more detail below using the drawings, the bent portion 4 is formed by performing the aforesaid pressing process while restraining the outer peripheral side sheet surface 10, and serves to absorb excess thickness generated when the recessed portions 30 are formed. By forming the bent portion 4 in an inner peripheral portion of the thin annular portion 3 in this manner, the excess thickness generated during formation of the recessed portions 30 can be prevented from acting on the outer peripheral side sheet surface 10, and as a result, the excess thickness can be prevented from affecting an outer shape of the lid 1. Further, by forming the bent portion 4 with a wave-shaped cross-section, a surface area of the bent portion 4 can be increased while keeping an amount by which the bent portion 4 projects from the outer peripheral side sheet surface 10 small. By increasing the surface area of the bent portion 4, the internal pressure of the battery case for which the lid 1 is used can be exerted on the safety valve 2 in a larger amount. Further, by reducing the projection amount of the bent portion 4 from the outer peripheral side sheet surface 10, the possibility of contact between the bent portion 4 and another member can be reduced, thereby reducing the possibility of breakage of the safety valve 2.

Figure 4:
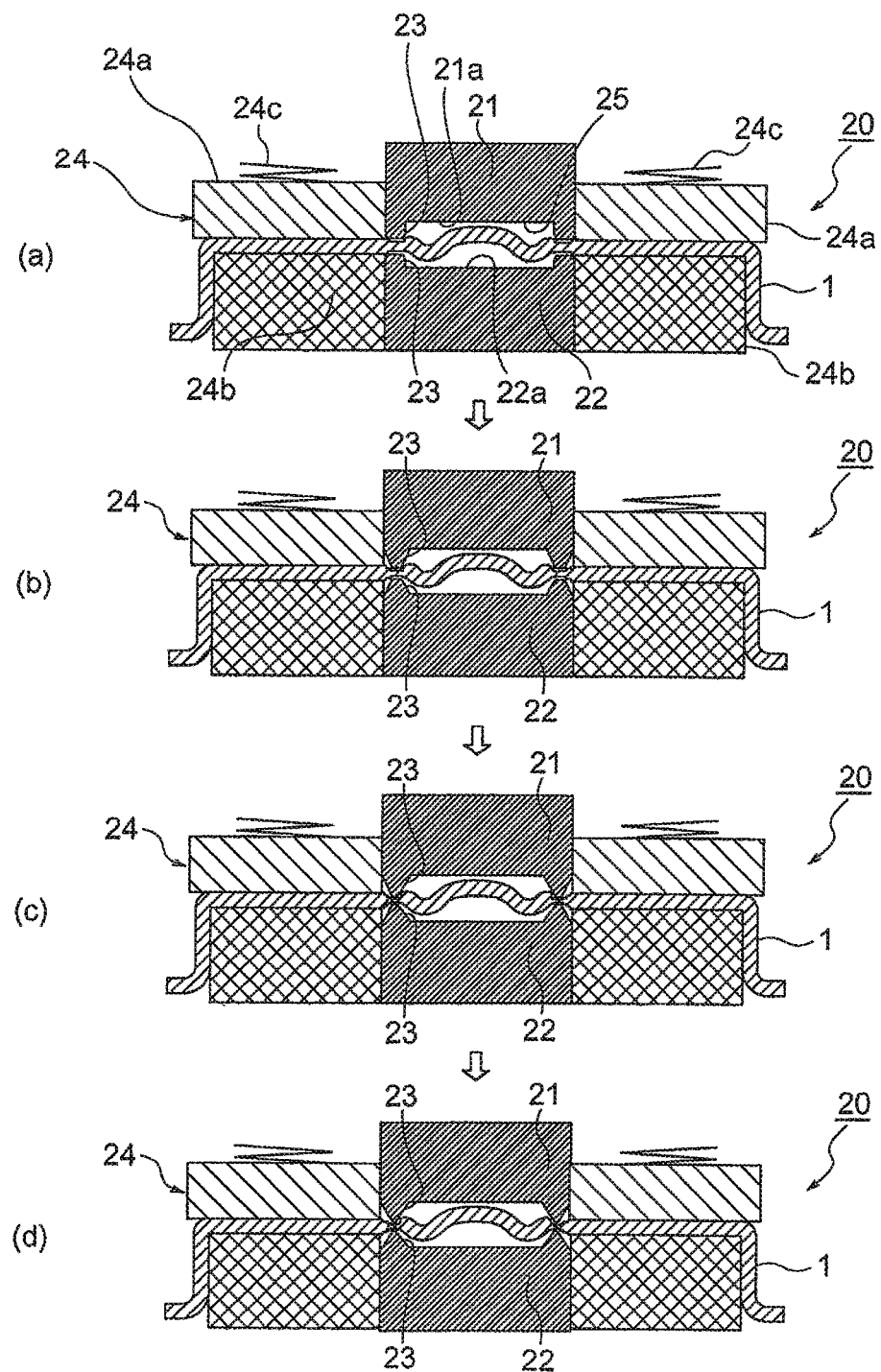
FIGS. 4(a)-4(d) are configuration diagrams showing an apparatus for manufacturing a safety valve for manufacturing the safety valve of FIG. 1.

FIG. 4 is a configuration diagram showing a safety valve manufacturing apparatus for manufacturing the safety valve 2 of FIG. 1, wherein (a) to (d) of FIG. 4 show first to fourth coining processes of a safety valve manufacturing method implemented using the safety valve manufacturing apparatus. As shown in FIG. 4, a safety valve manufacturing apparatus 20 includes a plurality of sets of a punch 21 and a die 22 used respectively in the first to fourth coining processes, the plurality of sets of the annular projecting portions 23 provided on the respective punches 21 and dies 22, and restraining means 24 provided on respective side portions of the punches 21 and dies 22.

The annular projecting portions 23 are projections provided on the respective punches 21 and dies 22 so as to oppose each other. Although only shown in cross-section in FIG. 4, the annular projecting portions 23 are formed in an annular shape extending from central end surfaces 21a, 22a of the respective punches 21 and dies 22 around outer edges of the punches 21 and dies 22 in alignment with the shape of the thin annular portion 3 (see FIG. 1). The annular projecting portions 23 have different tip end widths for each set of punches 21 and dies 22. A central recessed portion 25 having the annular projecting portion 23 as a side wall and the central end surface 21a, 22a as a bottom surface is formed on an inner peripheral side of the annular projecting portion 23 on each punch 21 and die 22.

The restraining means 24 includes a blank holder 24a disposed on a side portion of the punch 21, a die holder 24b disposed on a side portion of the die 22, and a biasing member 24c connected to the blank holder 24a. The blank holder 24a and the biasing member 24c are displaced integrally with the punch 21. The biasing member 24c is constituted by a coil spring or the like, for example, and serves to bias the blank holder 24a toward the die holder 24b. In other words, when the punch 21 is displaced toward the die 22, the restraining means 24 restrains (sandwiches) the lid 1 disposed between the punch 21 and the die 22 on an outer peripheral side of the annular projecting portions 23.

Next, the method for manufacturing a safety valve implemented using the apparatus for manufacturing a safety valve of FIG. 4 will be described. To form the safety valve 2 shown in FIGS. 1 to 3 in the lid 1, the first to fourth coining processes shown in (a) to (d) of FIG. 4 are performed sequentially.

In the first coining process, the punch 21 and the die 22 provided with the annular projecting portions 23 having the greatest tip end width are used. The lid 1 provided with the side wall portion 11 and the flange portion 12 is disposed between the punch 21 and the die 22, whereupon the punch 21 is displaced toward the die 22. As a result, the annular projecting portions 23 are pressed against the respective surfaces (the front surface 13 and the rear surface 14) of the lid 1 simultaneously while the lid 1 is restrained by the restraining means 24 on the outer peripheral side of the annular projecting portions 23.

The first step portions 30b shown in FIG. 3 are formed in the first coining process. Here, excess thickness is generated when the first step portions 30b are formed, but since the lid 1 is restrained by the restraining means 24 on the outer peripheral side of the annular projecting portions 23, the excess thickness escapes only to an inner peripheral side of the first step portions 30b. In other words, the excess thickness generated during formation of the first step portions 30b is absorbed by the sheet surface on the inner peripheral side of the first step portions 30b, which deforms so as to bend within the central recessed portions 25 of the punch 21 and the die 22 while increasing in thickness. Hence, the excess thickness generated during formation of the first step portions 30b can be prevented from acting on the sheet surface on the outer peripheral side of the first step portions 30b, and as a result, the outer shape of the lid 1 can be prevented from deforming.

In the second coining process, the punch 21 and the die 22 provided with the annular projecting portions 23 having a smaller tip end width than the annular projecting portions 23 used in the first coining process are used, and by pressing the annular projecting portions 23 against bottom portions of the respective first step portions 30b, the second step portions 30c are formed. Excess thickness generated during formation of the second step portions 30c is likewise absorbed by the sheet surface on an inner peripheral side of the second step portions 30c, which deforms so as to bend while increasing in thickness.

Similarly, in the third coining process, the punch 21 and the die 22 provided with the annular projecting portions 23 having a smaller tip end width than the annular projecting portions 23 used in the second coining process are used, and by pressing the annular projecting portions 23 against bottom portions of the respective second step portions 30c, the third step portions 30d are formed. Further, in the fourth coining process, the punch 21 and the die 22 provided with the annular projecting portions 23 having a smaller tip end width than the annular projecting portions 23 used in the third coining process are used, and by pressing the annular projecting portions 23 against bottom portions of the respective third step portions 30d, the thinnest portions 30a are formed. Excess thickness generated during formation of the third step portions 30d and the thinnest portions 30a is likewise absorbed by the sheet surface on an inner peripheral side of the third step portions 30d and the thinnest portions 30a, which deforms so as to bend while increasing in thickness.

In other words, the thin annular portion 3 is formed in the lid 1 through the first to fourth coining processes by disposing the lid 1 between the punch 21 and the die 22 and pressing the mutually opposing annular projecting portions 23 provided on the punch 21 and the die 22 simultaneously against the respective surfaces of the lid 1. When the thin annular portion 3 is formed by pressing the mutually opposing annular projecting portions 23 simultaneously against the respective surfaces of the lid 1 in this manner, a processing amount applied to the lid 1 by a single annular projecting portion 23 can be reduced in comparison with a conventional method in which an annular projecting portion is pressed against a single surface of a lid, and as a result, the working load exerted on the single annular projecting portion 23 can be reduced. In other words, the appearance of cracks during processing and the occurrence of work hardening can be suppressed when the thin annular portion 3 is formed using a stainless steel metal sheet, and therefore the thin annular portion 3 can be molded precisely. Moreover, the working load can be dispersed between the punch 21 and the die 22, and therefore the lifespan of a die assembly can be lengthened. Furthermore, the thin annular portion 3 is formed by multistage coining in which the plurality of sets of the annular projecting portions 23 are pressed against the respective surfaces of the lid 1 in descending order of the tip end width, and therefore the thinnest portion 30a and the first to third step portions 30b to 30d can be formed in the thin annular portion 3. As a result, efficiency quality inspections performed on the thin annular portion 3 using the first to third step portions 30b to 30d can be improved.

Next, examples will be described. The present inventor formed the safety valve 2 on the lid 1, which was constituted by steel sheet SUS430 having a nominal sheet thickness of 0.8 mm as a material and on which the side wall portion 11 and the flange portion 12 were formed in a pressing process, by implementing the first to fourth coining processes shown in FIG. 4 on the lid 1. Note that the thin annular portion 3 was formed in an elliptical shape having a long side of 15 mm and a short side of 10 mm, and the thickness of the thinnest portion 30a was set at 0.015 mm. Further, a punch 21 and a die 22 provided with annular projecting portions 23 having a tip end width of 1.5 mm were used in the first coining process, a punch 21 and a die 22 provided with annular projecting portions 23 having a tip end width of 1.0 mm were used in the second coining process, a punch 21 and a die 22 provided with annular projecting portions 23 having a tip end width of 0.5 mm were used in the third coining process, and a punch 21 and a die 22 provided with annular projecting portions 23 having a tip end with a 60° triangular cross-section and a tip end R of 0.2 R were used in the fourth coining process. Furthermore, a depth of the respective central recessed portions 25 of the punch 21 and the die 22 was set at the nominal sheet thickness, i.e. 0.8 mm, throughout the first to fourth coining processes.

Under these conditions, a crushing rate [%] of the lid 1 during the first to fourth coining processes was modified in accordance with examples A to K shown below on Table 1, whereupon the relationship between the crushing rate of the lid 1 and breakage of the die assembly was investigated. The crushing rate [%] represents a degree to which the sheet surface of the lid 1 is crushed during the respective coining processes, and takes the form of a numerical value determined from {(sheet thickness during previous process−sheet thickness during following process)/sheet thickness during previous process}×100. Note that the sheet thickness during the previous process when determining the crushing rate of the first coining process is the nominal sheet thickness of the steel sheet used as the material.

TABLE 1

| Example | Material sheet thickness Upper stage/ Sheet thickness mm | First coining process Upper stage/ Sheet thickness mm Lower stage/ Crushing rate % | Second coining process Upper stage/ Sheet thickness mm Lower stage/ Crushing rate % | Third coining process Upper stage/ Sheet thickness mm Lower stage/ Crushing rate % | Fourth coining process Upper stage/ Sheet thickness mm Lower stage/ Crushing rate % | Die assembly breakage condition |
|---|---|---|---|---|---|---|
| A | 0.8 | 0.5 38 | 0.15 70 | 0.05 67 | 0.015 70 | |
| B | 0.8 | 0.5 38 | 0.15 70 | 0.06 60 | 0.015 75 | Cracks appear in punch during fourth coining process |
| C | 0.8 | 0.15 81 | 0.05 67 | 0.025 50 | 0.015 40 | Cracks appear in punch during first coining process |
| D | 0.8 | 0.25 69 | 0.05 80 | 0.025 50 | 0.015 40 | Cracks appear in punch during second coining process |
| E | 0.8 | 0.25 69 | 0.1 60 | 0.05 50 | 0.015 70 | |
| F | 0.8 | 0.25 69 | 0.1 60 | 0.04 60 | 0.015 63 | |

TABLE 1-continued

| Example | Material sheet thickness Upper stage/ Sheet thickness mm | First coining process Upper stage/ Sheet thickness mm Lower stage/ Crushing rate % | Second coining process Upper stage/ Sheet thickness mm Lower stage/ Crushing rate % | Third coining process Upper stage/ Sheet thickness mm Lower stage/ Crushing rate % | Fourth coining process Upper stage/ Sheet thickness mm Lower stage/ Crushing rate % | Die assembly breakage condition |
|---|---|---|---|---|---|---|
| G | 0.8 | 0.25 / 69 | 0.1 / 60 | 0.03 / 70 | 0.015 / 50 | |
| H | 0.8 | 0.25 / 69 | 0.08 / 68 | 0.03 / 63 | 0.015 / 50 | |
| I | 0.8 | 0.3 / 63 | 0.08 / 73 | 0.03 / 63 | 0.015 / 50 | Cracks appear in punch during second coining process |
| J | 0.8 | 0.3 / 63 | 0.09 / 70 | 0.03 / 67 | 0.015 / 50 | |
| K | 0.8 | 0.3 / 63 | 0.1 / 67 | 0.04 / 60 | 0.015 / 63 | |

Crushing rate (%) = (sheet thickness during previous process − sheet thickness during following process)/sheet thickness during previous process × 100

As shown in Examples A, E to H, J, and K on Table 1, it was confirmed that when the coining processes were implemented while suppressing the crushing rate to no more than 70%, no cracks appeared in the annular projecting portions 23 of both the punch 21 and the die 22 even after 2000 shots. As shown in Examples B to D and I, on the other hand, when multistage coining including a coining process in which the crushing rate of the lid 1 exceeded 70% was implemented, it was found that cracks appeared in the annular projecting portion 23 of the punch 21 during the coining process in which the crushing rate exceeded 70% before the number of implementations reached 2000 shots. Hence, the crushing rate of the lid 1 during the respective coining processes is preferably set at no more than 70%. Note that in the safety valve 2 formed under the above conditions, the desired thin annular portion 3 was obtained without cracks and could be operated with stability within a pressure range of 0.6 to 0.8 MPa.

In the method for manufacturing a battery safety valve described above, the thin annular portion 3 constituting the edge portion of the safety valve 2 is formed in the lid 1 constituted by a stainless steel metal sheet by disposing the lid 1 between the punch 21 and the die 22 and simultaneously pressing the mutually opposing annular projecting portions 23 provided respectively on the punch 21 and the die 22 against the respective surfaces of the lid 1. Therefore, the amount of processing applied to the lid 1 by a single annular projecting portion 23 can be reduced in comparison with a conventional method in which an annular projecting portion is pressed against a single surface of a lid, and as a result, the working load exerted on the single annular projecting portion 23 can be reduced. Hence, the appearance of cracks during processing and the occurrence of work hardening can be suppressed during formation of the thin annular portion 3, and therefore the thin annular portion can be molded precisely. Moreover, the working load can be dispersed between the punch 21 and the die 22, and therefore the lifespan of the die assembly can be lengthened.

Furthermore, when the annular projecting portions 23 are pressed against the respective surfaces of the lid 1, the lid 1 is restrained by the restraining means 24 on the outer peripheral side of the annular projecting portions 23, and therefore the excess thickness generated during formation of the thin annular portion 3 escapes only to the inner peripheral side of the annular projecting portions 23. As a result, the excess thickness can be prevented from affecting the outer shape of the lid 1.

Further, the plurality of sets of annular projecting portions 23 having different tip end widths for each set of punches 21 and dies 22 are used, and the thin annular portion 3 is formed by the plurality of coining processes in which the annular projecting portions 23 are pressed against the respective surfaces of the lid 1 in descending order of the tip end width. Therefore, the working load exerted on a single annular projecting portion 23 can be reduced even further, enabling a further increase in the lifespan of the die assembly. Moreover, the plurality of step portions 30b having gradually decreasing thicknesses from the outer peripheral side sheet surface 10 toward the thinnest portion 30a can be provided on the thin annular portion 3, and therefore the position of the thinnest portion 30a can be specified easily using the step portions 30b. As a result, the efficiency of quality inspections for inspecting the thickness of the thin annular portion 3 can be improved.

Furthermore, the crushing rate of the lid 1 during the respective coining processes is set at no more than 70%, and therefore the possibility of breakage of the annular projecting portions 23 of the punches 21 and dies 22 can be further reduced. As a result, the lifespan of the die assembly can be lengthened more reliably.

Further, the apparatus for manufacturing a battery safety valve described above is configured to form the thin annular portion 3 constituting the edge portion of the safety valve 2 in the stainless steel lid 1 constituting the battery case of the battery by pressing the annular projecting portions simultaneously against the respective surfaces of the lid 1 in descending order of the tip end width while restraining the lid 1 on the outer peripheral side of the annular projecting portions 23 using the restraining means 24. Hence, similarly to the method for manufacturing a battery safety valve described above, the appearance of cracks during processing and the occurrence of work hardening can be suppressed during formation of the thin annular portion 3 while preventing the excess thickness generated during formation of the thin annular portion 3 from affecting the outer shape of the lid 1, and therefore the thin annular portion 3 can be molded precisely. Moreover, the working load can be dispersed between the punch 21 and the die 22, and therefore the lifespan of the die assembly can be lengthened.

Furthermore, in the battery safety valve 2 described above, the thin annular portion 3 is constituted by the pair of recessed portions that are formed on the respective surfaces of the lid 1 by a pressing process in which the mutually opposing annular projecting portions are pressed simultaneously against the respective surfaces of the stainless steel metal sheet constituting the battery case of the battery, and the bent portion 4 is provided on the inner peripheral side of the thin annular portion 3 and deformed by an action of the pressing process so as to bend in the sheet thickness direction. Hence, the appearance of cracks during processing and the occurrence of work hardening can be suppressed during formation of the safety valve 2, and therefore the thin annular portion 3 can be molded precisely. Moreover, the working load generated during formation of the thin annular portion 3 can be dispersed between the punch 21 and the die 22, and therefore the lifespan of the die assembly can be lengthened.

Further, the thin annular portion 3 is provided with the thinnest portion 30a serving as the thinnest part of the thin annular portion 3 and the first to third step portions 30b to 30d having gradually decreasing thicknesses from the outer peripheral side sheet surface 10 toward the thinnest portion 30a, and therefore the position of the thinnest portion 30a can be specified easily using the step portions 30b. As a result, the efficiency of quality inspection for inspecting the thickness of the thin annular portion 3 can be improved.

Second Embodiment

Figure 5:
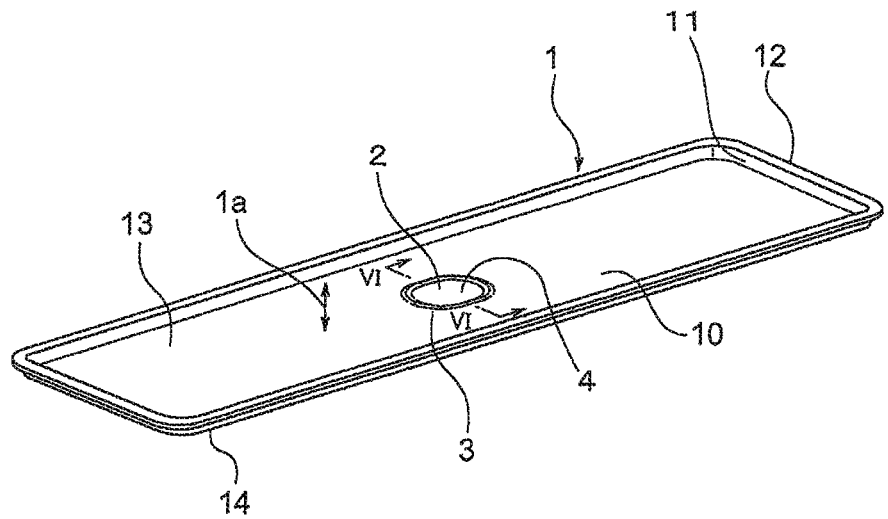
FIG. 5 is a perspective view showing a lid 1 of a battery case according to a second embodiment of the present invention.

FIG. 5 is a perspective view showing a lid 1 of a battery case according to a second embodiment of the present invention. In the drawing, the lid 1 constituting the battery case of a secondary battery is provided with a safety valve 2 for a secondary battery, which ruptures when an internal pressure of the battery case exceeds a predetermined value so as to release the internal pressure to the outside. The safety valve 2 is provided with a thin annular portion 3 and a bent portion 4.

The thin annular portion 3 is an elliptical groove constituting an edge portion of the safety valve 2, and is formed to be thinner than the remaining sheet surface of the lid 1. The thin annular portion 3 splits first when the internal pressure of the battery case exceeds a predetermined value, thereby causing the entire safety valve 2 to rupture. Note that an outer shape of the thin annular portion 3 may take any form having an enclosed outer edge, for example a circular form, a polygonal form, and so on. The bent portion 4 is a part of the sheet surface positioned on an inner peripheral side of the thin annular portion 3, which is deformed so as to bend in a sheet thickness direction 1a of the lid 1.

A part (to be referred to hereafter as an outer peripheral side sheet surface 10) of the sheet surface on an outer peripheral side of the thin annular portion 3 is formed to be flat. A side wall portion 11 that bends substantially at a right angle in the sheet thickness direction 1a and a flange portion 12 that bends substantially at a right angle from a tip end of the side wall portion 11 stand upright from an entire outer edge of the outer peripheral side sheet surface 10. Hereafter, an end face of the lid 1 in the standing direction of the side wall portion 11 will be referred to as a front surface 13, and an opposite side end face of the lid 1 will be referred to as a rear surface 14.

Figure 6:
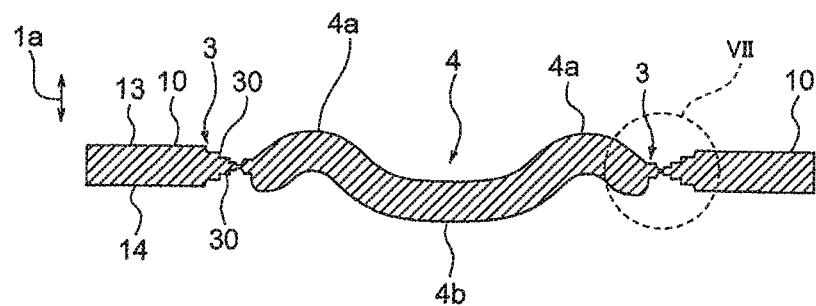
FIG. 6 is a sectional view taken along a line VI-VI in FIG. 5.
Figure 7:
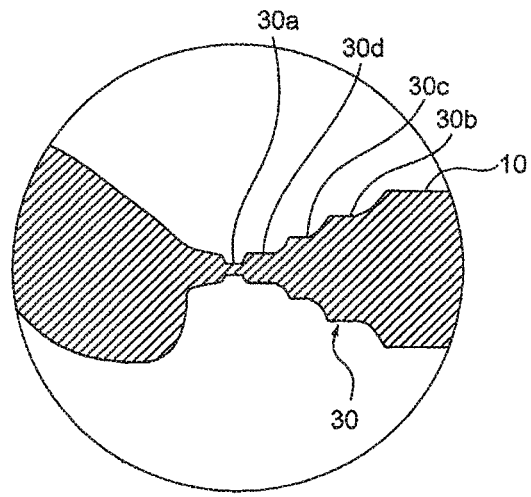
FIG. 7 is an enlarged view of a region VII in FIG. 6.

FIG. 6 is a sectional view taken along a line VI-VI in FIG. 5, and FIG. 7 is an enlarged view of a region VII in FIG. 6. As shown in FIG. 6, the thin annular portion 3 is constituted by a pair of recessed portions 30 formed respectively in the front surface 13 and the rear surface 14 of the lid 1. As will be described in more detail below using the drawings, the recessed portions 30 are formed by a pressing process in which mutually opposing annular projecting portions 23 are pressed simultaneously against the respective surfaces of a stainless steel metal sheet 100 serving as a material of the lid 1 (see FIG. 9).

Looking at the recessed portions 30 in more detail, as shown in FIG. 7, each recessed portion 30 includes a thinnest portion 30a serving as a thinnest part of the thin annular portion 3, and first to third step portions 30b to 30d formed at gradually decreasing thicknesses from the outer peripheral side sheet surface 10 toward the thinnest portion 30a. As will be described in more detail below using the drawings, the thinnest portion 30a and the first to third step portions 30b to 30d are formed by multistage coining in which a plurality of sets of the annular projecting portions 23 having different tip end widths are pressed simultaneously against the respective surfaces of the lid 1 in descending order of the tip end width (see (a) to (d) of FIG. 9). By providing the plurality of step portions 30b having gradually decreasing thicknesses from the outer peripheral side sheet surface 10 toward the thinnest portion 30a on the recessed portions 30 in this manner, a position of the thinnest portion 30a can be specified easily, and as a result, the efficiency of quality inspection for inspecting the thickness of the thin annular portion 3 can be improved.

Returning to FIG. 6, the bent portion 4 is provided with a first projecting portion 4a and a second projecting portion 4b. The first projecting portion 4a projects from the front surface 13 of the lid 1 on the outer peripheral side of the thin annular portion 3 in the sheet thickness direction 1a. The second projecting portion 4b projects from the rear surface 14 of the lid 1 on the outer peripheral side of the thin annular portion 3 in the sheet thickness direction 1a. In other words, the bent portion 4 is deformed to bend in both a front surface direction and a rear surface direction of the lid 1 rather than in only one of the front surface direction and the rear surface direction, and therefore has a wave-shaped cross-section. As will be described in more detail below using the drawings, the bent portion 4 is formed by performing the aforesaid pressing process while restraining the outer peripheral side sheet surface 10, and serves to absorb excess thickness generated when the recessed portions 30 are formed. By forming the bent portion 4 in an inner peripheral portion of the thin annular portion 3 in this manner, the excess thickness generated during formation of the recessed portions 30 can be prevented from acting on the outer peripheral side sheet surface 10, and as a result, the effect of the excess thickness on an outer shape of the lid 1 can be reduced. Further, by forming the bent portion 4 with a wave-shaped cross-section, the surface area of the bent portion 4 can be increased while keeping an amount by which the bent portion 4 projects from the outer peripheral side sheet surface 10 small. By increasing the surface area of the bent portion 4, the internal pressure of the battery case for which the lid 1 is used can be exerted on the safety valve 2 in a greater amount. Further, by reducing the projection amount of the bent portion 4 from the outer peripheral side sheet surface 10, the possibility of contact between the bent portion 4 and another member can be reduced, thereby reducing the possibility of breakage of the safety valve 2.

Figure 8:
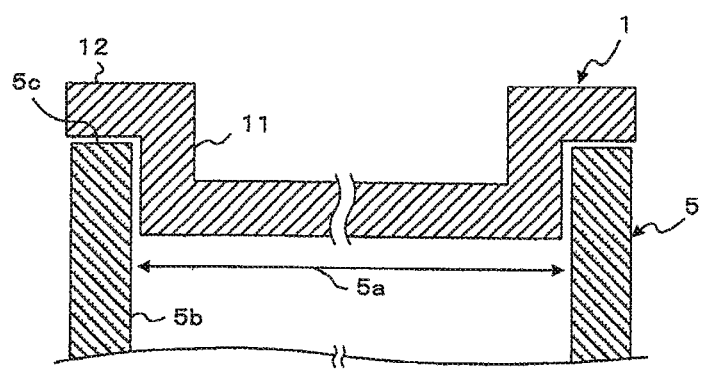
FIG. 8 is an illustrative view showing a relationship between the lid 1 of FIG. 5 and a case main body.

FIG. 8 is an illustrative view showing a relationship between the lid 1 of FIG. 5 and a case main body 5. Although shown only in outline in FIG. 8, the case main body 5 forms the battery case together with the lid 1, and is constituted by a stainless steel container formed in a closed-end tubular shape having an opening portion 5a. The lid 1 is inserted into the opening portion 5a such that an outer surface of the side wall portion 11 aligns with an inner peripheral surface 5b of the case main body 5. When the lid 1 is inserted into the opening portion 5a, a lower surface of the flange portion 12 overlaps an upper end portion 5c of the case main body 5. The lid 1 and the case main body 5 are integrated by welding the lower surface of the flange portion 12 to the upper end portion 5c of the case main body 5 using laser welding or the like, for example.

Here, as described above, the excess thickness generated during formation of the recessed portions 30 is absorbed by the bent portion 4 by performing the pressing process while restraining the outer peripheral side sheet surface 10. However, it is difficult to have the bent portion 4 absorb all of the excess thickness. When the excess thickness is applied to the outer peripheral side sheet surface 10, elastic strain remains in the outer peripheral side sheet surface 10 on a periphery of the thin annular portion 3, causing the lid 1 to buckle. If the lid 1 buckles by a large amount, a large gap is formed between the lower surface of the flange portion 12 and the upper end portion 5c of the case main body 5, shown in FIG. 8, making it difficult to weld the lid 1 to the case main body 5. According to this embodiment, elastic strain can be eliminated by manufacturing the lid 1 using a manufacturing method to be described below, and as a result, buckling of the lid 1 due to elastic strain can be suppressed.

Figure 9:
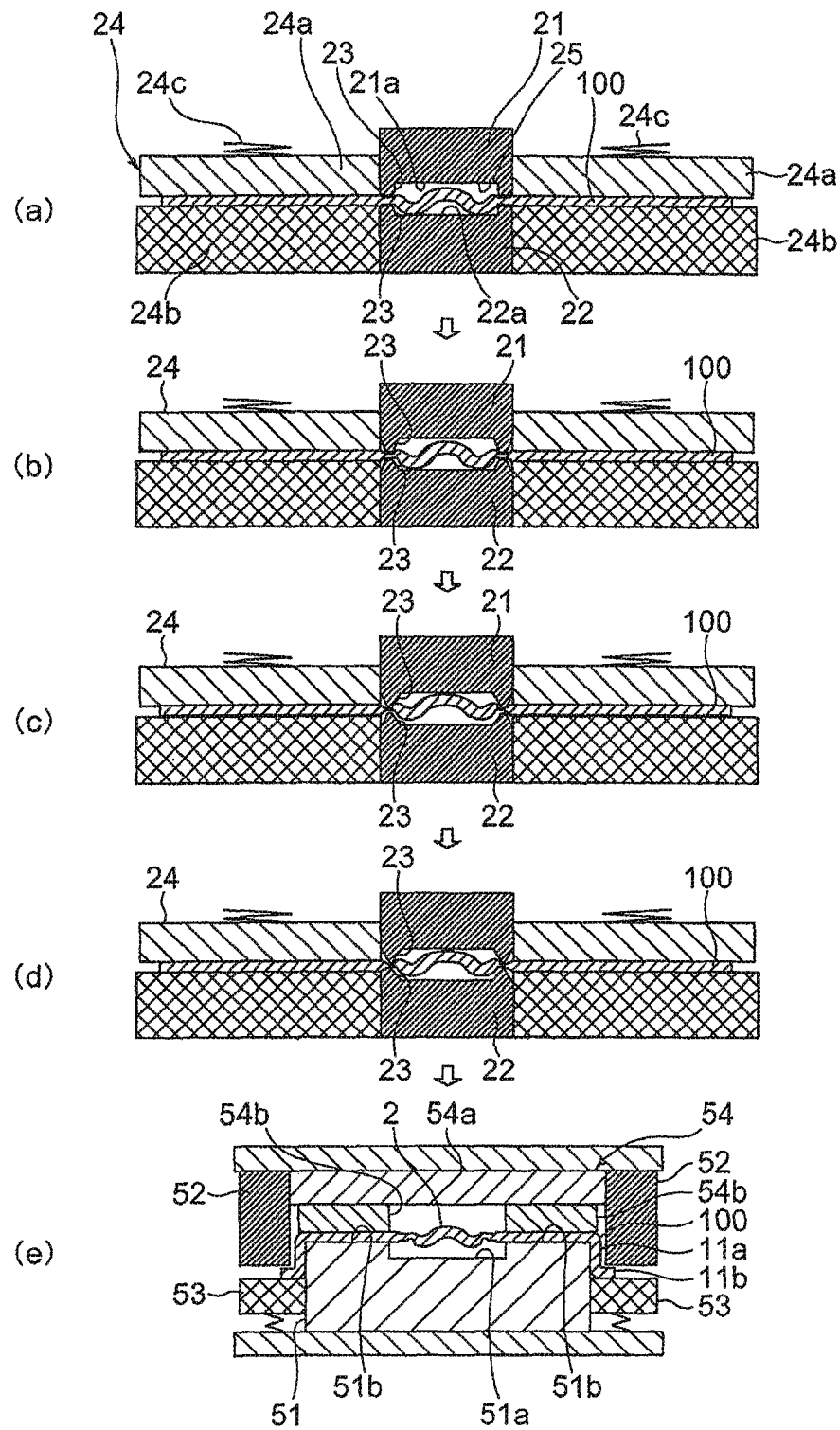
FIGS. 9(a)-9(e) are configuration diagrams showing an apparatus for manufacturing a lid for manufacturing the lid 1 of FIG. 5.

FIG. 9 is a configuration diagram showing a lid manufacturing apparatus for manufacturing the lid 1 of FIG. 5, wherein (a) to (b) of FIG. 9 show a coining process of a lid manufacturing method implemented using the lid manufacturing apparatus, and (e) of FIG. 9 shows a side wall forming process of the lid manufacturing method. As shown in (a) to (d) of FIG. 9, in the coining process, multistage coining is performed using a plurality of sets of punches 21 and dies 22, the plurality of sets of the annular projecting portions 23 provided on the respective punches 21 and dies 22, and restraining means 24 provided on respective side portions of the punches 21 and dies 22.

The annular projecting portions 23 are projections provided on the respective punches 21 and dies 22 so as to oppose each other. Although only shown in cross-section in FIG. 9, the annular projecting portions 23 are formed in an annular shape extending from central end surfaces 21a, 22a of the respective punches 21 and dies 22 around outer edges of the punches 21 and dies 22 in alignment with the shape of the thin annular portion 3 (see FIG. 5). The respective sets of the punches 21 and dies 22 include annular projecting portions 23 having different tip end widths. A central recessed portion 25 having the annular projecting portion 23 as a side wall and the central end surface 21a, 22a as a bottom surface is formed on an inner peripheral side of the annular projecting portion 23 on each punch 21 and each die 22.

The restraining means 24 includes a blank holder 24a disposed on a side portion of the punch 21, a die holder 24b disposed on a side portion of the die 22, and a biasing member 24c are connected to the blank holder 24a. The blank holder 24a and the biasing member 24c are displaced integrally with the punch 21. The biasing member 24c is constituted by a coil spring or the like, for example, and serves to bias the blank holder 24a toward the die holder 24b. In other words, when the punch 21 is displaced toward the die 22, the restraining means 24 restrains (sandwiches) the lid 1 disposed between the punch 21 and the die 22 on an outer peripheral side of the annular projecting portions 23.

As shown in FIG. 9E, a punch 51, an annular die 52 disposed in an outer peripheral position of the punch 51, an annular holder 53 disposed opposite the die 52, and restraining means 54 provided in an inner peripheral position of the die 52 are used in the side wall forming process. The punch 51, the die 52, and the holder 53 implement a drawing process on the metal sheet 100 serving as the material of the lid 1. A recessed portion 51a disposed in a position corresponding to the safety valve 2 of the lid 1 and a support portion 51b surrounding the recessed portion 51a are provided on an upper portion of the punch 51.

The restraining means 54 is provided with a cushion pad 54a, and an annular pressing body 54b attached to the cushion pad 54a. The cushion pad 54a is constituted by an elastic body such as urethane, for example. The pressing body 54b is constituted by a metal and formed in an annular shape so as to oppose the support portion 51b of the punch 51.

Next, the lid manufacturing method implemented using the lid manufacturing apparatus of FIG. 9 will be described. To form the lid 1 shown in FIGS. 5 to 8, the coining process shown in (a) to (d) of FIG. 9 is performed, followed by the side wall forming process shown in (e) of FIG. 9.

In a first stage of the coining process, shown in (a) of FIG. 9, the punch 21 and the die 22 provided with the annular projecting portions 23 having the greatest tip end width are used. The flat sheet-shaped metal sheet 100 serving as the material of the lid 1 is disposed between the punch 21 and the die 22, whereupon the punch 21 is displaced toward the die 22. As a result, the annular projecting portions 23 are pressed against the respective surfaces (the front surface 13 and the rear surface 14) of the metal sheet 100 simultaneously while the metal sheet 100 is restrained by the restraining means 24 on the outer peripheral side of the annular projecting portions 23.

The first step portions 30b shown in FIG. 7 are formed in the first coining process. Here, excess thickness is generated when the first step portions 30b are formed, but since the metal sheet 100 is restrained by the restraining means 24 on the outer peripheral side of the annular projecting portions 23, a majority of the excess thickness escapes to an inner peripheral side of the first step portions 30b. In other words, the majority of the excess thickness generated during formation of the first step portions 30b is absorbed by the sheet surface on the inner peripheral side of the first step portions 30b, which deforms so as to bend within the central recessed portions 25 of the punch 21 and the die 22 while increasing in thickness. Hence, the extent to which the excess thickness generated during formation of the first step portions 30b acts on the sheet surface on the outer peripheral side of the first step portions 30b can be reduced.

In a second stage of the coining process, shown in (b) of FIG. 9, the punch 21 and the die 22 provided with the annular projecting portions 23 having a smaller tip end width than the annular projecting portions 23 used in the first coining process are used, and by pressing the annular projecting portions 23 against bottom portions of the respective first step portions 30b, the second step portions 30c are formed. A majority of the excess thickness generated during formation of the second step portions 30c is likewise absorbed by the sheet surface on an inner peripheral side of the second step portions 30*c*, which deforms so as to bend while increasing in thickness.

Similarly, in a third stage of the coining process, shown in (c) of FIG. 9, the punch 21 and the die 22 provided with the annular projecting portions 23 having a smaller tip end width than the annular projecting portions 23 used in the second stage of the coining process are used, and by pressing the annular projecting portions 23 against bottom portions of the respective second step portions 30*c*, the third step portions 30*d* are formed. Further, in a fourth stage of the coining process, shown in (d) of FIG. 9, the punch 21 and the die 22 provided with the annular projecting portions 23 having a smaller tip end width than the annular projecting portions 23 used in the third stage of the coining process are used, and by pressing the annular projecting portions 23 against bottom portions of the respective third step portions 30*c*, the thinnest portions 30*a* are formed. In other words, in the fourth stage of the coining process, the thickness of the annular projecting portion 23 is reduced to a final target thickness. A majority of the excess thickness generated during formation of the third step portions 30*d* and the thinnest portions 30*a* is likewise absorbed by the sheet surface on an inner peripheral side of the third step portions 30*d* and the thinnest portions 30*a*, which deforms so as to bend while increasing in thickness.

When the thin annular portion 3 is formed by pressing the mutually opposing annular projecting portions 23 against the respective surfaces of the metal sheet 100 simultaneously in this manner, a processing amount applied to the metal sheet 100 by a single annular projecting portion 23 can be reduced in comparison with a conventional method in which an annular projecting portion is pressed against a single surface of a lid, and as a result, the working load exerted on the single annular projecting portion 23 can be reduced. In other words, the appearance of cracks during processing and the occurrence of work hardening can be suppressed when the thin annular portion 3 is formed using a stainless steel metal sheet, and therefore the thin annular portion 3 can be molded precisely. Moreover, the working load can be dispersed between the punch 21 and the die 22, and therefore the lifespan of a die assembly can be lengthened.

Furthermore, the thin annular portion 3 is formed by multistage coining in which the plurality of sets of the annular projecting portions 23 are pressed against the respective surfaces of the metal sheet 100 in descending order of the tip end width, and therefore the thinnest portion 30*a* and the first to third step portions 30*b* to 30*d* can be formed in the thin annular portion 3. As a result, the efficiency of quality inspection performed on the thin annular portion 3 using the first to third step portions 30*b* to 30*d* can be improved.

In the side wall forming process shown in (e) of FIG. 9, a drawing process is implemented on the metal sheet 100 by placing the metal sheet 100 on the punch 51 such that the thin annular portion 3 is positioned inside the recessed portion 51*a* and then lowering the die 52. In other words, as the die 52 descends, the metal sheet 100 is bent and stretched between an inner peripheral surface of the die 52 and an outer peripheral surface of the punch 51, and as a result, the side wall portion 11 is formed. When the die 52 is lowered further after a tip end of the bent metal sheet 100 contacts the holder 53, the tip end of the metal sheet 100 bends along the holder 53, thereby forming the flange portion 12.

Elastic strain is generated in the outer peripheral side sheet surface 10 by the excess thickness generated in the coining process described above. However, in the drawing process implemented during the side wall forming process, tensile strain can be applied to the outer peripheral side sheet surface 10, thereby canceling out the elastic strain generated in the coining process. Hence, the elastic strain generated during the coining process can be eliminated, and as a result, buckling of the lid 1 due to elastic strain can be suppressed.

Here, (e) of FIG. 9 shows a final stage of the drawing process, but the die assembly used in the side wall forming process is configured such that when the die 52 is lowered toward the punch 51, the pressing body 54*b* contacts the metal sheet 100 before the die 52. When the die 52 is lowered further after the pressing body 54*b* contacts the metal sheet 100, the outer peripheral side sheet surface 10 on the periphery of the thin annular portion 3 is restrained by the pressing body 54*b* and the support portion 51*b* while the cushion pad 54*a* is compressed.

When tensile stress generated during the drawing process described above acts on the thin annular portion 3 in a large amount, the thin annular portion 3 may break. In this embodiment, the drawing process is implemented on the metal sheet 100 in a condition where the outer peripheral side sheet surface 10 on the periphery of the thin annular portion 3 is restrained by the restraining means 54, and therefore breakage of the thin annular portion 3 is avoided. Note that (e) of FIG. 9 shows a condition in which the entire outer peripheral side sheet surface 10 is restrained, but the outer peripheral side sheet surface 10 may be restrained in a smaller range on the periphery of the thin annular portion 3.

Next, examples will be described. The present inventor formed the lid 1 by implementing the coining process and the side wall forming process shown in FIG. 9 using steel sheet SUS430 having a nominal sheet thickness of 0.8 mm as a material. Note that the thin annular portion 3 was formed in an elliptical shape having a long side of 15 mm and a short side of 10 mm, and the thickness (the final target thickness) of the thinnest portion 30*a* was set at 0.015 mm. Further, a punch 21 and a die 22 provided with annular projecting portions 23 having a tip end width of 1.5 mm were used in the first stage of the coining process, a punch 21 and a die 22 provided with annular projecting portions 23 having a tip end width of 1.0 mm were used in the second stage of the coining process, a punch 21 and a die 22 provided with annular projecting portions 23 having a tip end width of 0.5 mm were used in the third stage of the coining process, and a punch 21 and a die 22 provided with annular projecting portions 23 having a tip end with a 60° triangular cross-section and a tip end R of 0.2 R were used in the fourth stage of the coining process. Furthermore, the depth of the respective central recessed portions 25 of the punch 21 and the die 22 was set at the nominal sheet thickness, i.e. 0.8 mm, throughout the first to fourth stages of the coining process.

Under these conditions, a crushing rate [%] of the lid 1 during the first to fourth stages of the coining process was modified in accordance with examples A to K shown below on Table 2, whereupon a relationship between the crushing rate of the metal sheet 100 and breakage of the die assembly was investigated. The crushing rate [%] represents the degree to which the sheet surface of the lid 1 is crushed during the respective coining processes, and takes the form of a numerical value determined from {(sheet thickness during previous process−sheet thickness during following process)/sheet thickness during previous process}×100. Note that the sheet thickness during the previous process when determining the crushing rate of the first coining process is the nominal sheet thickness of the steel sheet used as the material.

TABLE 2

| Example | Material sheet thickness Upper stage/ Sheet thickness mm | First coining process Upper stage/ Sheet thickness mm Lower stage/ Crushing rate % | Second coining process Upper stage/ Sheet thickness mm Lower stage/ Crushing rate % | Third coining process Upper stage/ Sheet thickness mm Lower stage/ Crushing rate % | Fourth coining process Upper stage/ Sheet thickness mm Lower stage/ Crushing rate % | Die assembly breakage condition |
|---|---|---|---|---|---|---|
| A | 0.8 | 0.5 / 38 | 0.15 / 70 | 0.05 / 67 | 0.015 / 70 | |
| B | 0.8 | 0.5 / 38 | 0.15 / 70 | 0.06 / 60 | 0.015 / 75 | Cracks appear in punch during fourth coining process |
| C | 0.8 | 0.15 / 81 | 0.05 / 67 | 0.025 / 50 | 0.015 / 40 | Cracks appear in punch during first coining process |
| D | 0.8 | 0.25 / 69 | 0.05 / 80 | 0.025 / 50 | 0.015 / 40 | Cracks appear in punch during second coining process |
| E | 0.8 | 0.25 / 69 | 0.1 / 60 | 0.05 / 50 | 0.015 / 70 | |
| F | 0.8 | 0.25 / 69 | 0.1 / 60 | 0.04 / 60 | 0.015 / 63 | |
| G | 0.8 | 0.25 / 69 | 0.1 / 60 | 0.03 / 70 | 0.015 / 50 | |
| H | 0.8 | 0.25 / 69 | 0.08 / 68 | 0.03 / 63 | 0.015 / 50 | |
| I | 0.8 | 0.3 / 63 | 0.08 / 73 | 0.03 / 63 | 0.015 / 50 | Cracks appear in punch during second coining process |
| J | 0.8 | 0.3 / 63 | 0.09 / 70 | 0.03 / 67 | 0.015 / 50 | |
| K | 0.8 | 0.3 / 63 | 0.1 / 67 | 0.04 / 60 | 0.015 / 63 | |

Crushing rate (%) = (sheet thickness during previous process − sheet thickness during following process)/sheet thickness during previous process × 100

As shown in Examples A, E to H, J, and K in Table 2, it was confirmed that when the coining process was implemented while suppressing the crushing rate to no more than 70%, no cracks appeared in the annular projecting portions 23 of both the punch 21 and the die 22 even after 2000 shots. As shown in Examples B to D and I, on the other hand, when multistage coining including a coining process in which the crushing rate of the metal sheet 100 exceeded 70% was implemented, it was found that cracks appeared in the annular projecting portion 23 of the punch 21 during the coining process in which the crushing rate exceeded 70% before the number of implementations reached 2000 shots. Hence, the crushing rate of the metal sheet 100 during the respective stages of the coining process is preferably set at no more than 70%. Note that in the safety valve 2 formed under the above conditions, the desired thin annular portion 3 was obtained without cracks, and could be operated with stability within a pressure range of 0.6 to 0.8 MPa.

Further, when the lid 1 is manufactured by a method of molding the safety valve 2 onto the lid 1 on which the side wall portion has been formed using a conventional drawing process, a twist amount of approximately 0.5 mm may occur in the flange portion 12, leading to welding defects. When the lid 1 was manufactured using the method according to this embodiment, on the other hand, it was possible to suppress the twist amount to no more than 0.3 mm, and therefore welding defects could be avoided.

In the method for manufacturing a battery case lid described above, the thin annular portion 3 is formed in the coining process by pressing the mutually opposing annular projecting portions 23 against the front and rear surfaces of the metal sheet 100 simultaneously. Therefore, the amount of processing applied to the lid 1 by a single annular projecting portion 23 can be reduced in comparison with a conventional method in which the annular projecting portion is pressed against a single surface of the metal sheet 100, and as a result, the working load exerted on the single annular projecting portion 23 can be reduced. Hence, the appearance of cracks during processing and the occurrence of work hardening can be suppressed during formation of the thin annular portion 3, and therefore the thin annular portion can be molded precisely. Moreover, the working load can be dispersed between the punch 21 and the die 22, and therefore the lifespan of the die assembly can be lengthened.

Further, the side wall portion 11 is formed on the metal sheet 100 by implementing the drawing process on the metal sheet 100 following the coining process, and therefore tensile strain generated in the drawing process can be applied to the sheet surface on which elastic strain occurs during the coining process. The elastic strain generated in the coining process can therefore be eliminated, and as a result, buckling of the lid due to elastic strain can be suppressed.

Furthermore, in the side wall forming process, the drawing process is performed in a condition where the outer peripheral side sheet surface 10 on the periphery of the thin annular portion 3 is restrained by the restraining means 54. Therefore, tensile stress generated during the drawing process can be prevented from acting on the thin annular portion 3 in a large amount, and as a result, breakage of the thin annular portion 3 can be avoided.

Moreover, in the coining process, multistage coining is performed using the plurality of annular projecting portions 23 having different tip end widths such that the annular projecting portions 23 are pressed against the metal sheet 100 in descending order of the tip end width. Hence, the working load exerted on a single annular projecting portion 23 can be reduced even further, enabling a further improvement in the lifespan of the die assembly. Furthermore, by providing the thin annular portion 3 with the plurality of step portions 30*b* having gradually decreasing thicknesses from the outer peripheral side sheet surface 10 toward the thinnest portion 30*a*, the position of the thinnest portion 30*a* can be specified easily using the step portions 30*b*, and as a result, the efficiency of quality inspection for inspecting the thickness of the thin annular portion 3 can be improved.

Further, by setting the crushing rate of the metal sheet during the respective stages of the coining process at no more than 70%, the possibility of breakage of the annular projecting portions 23 of the punch 21 and die 22 can be further reduced, and as a result, the lifespan of the die assembly can be more reliably lengthened.

Third Embodiment

Figure 10:
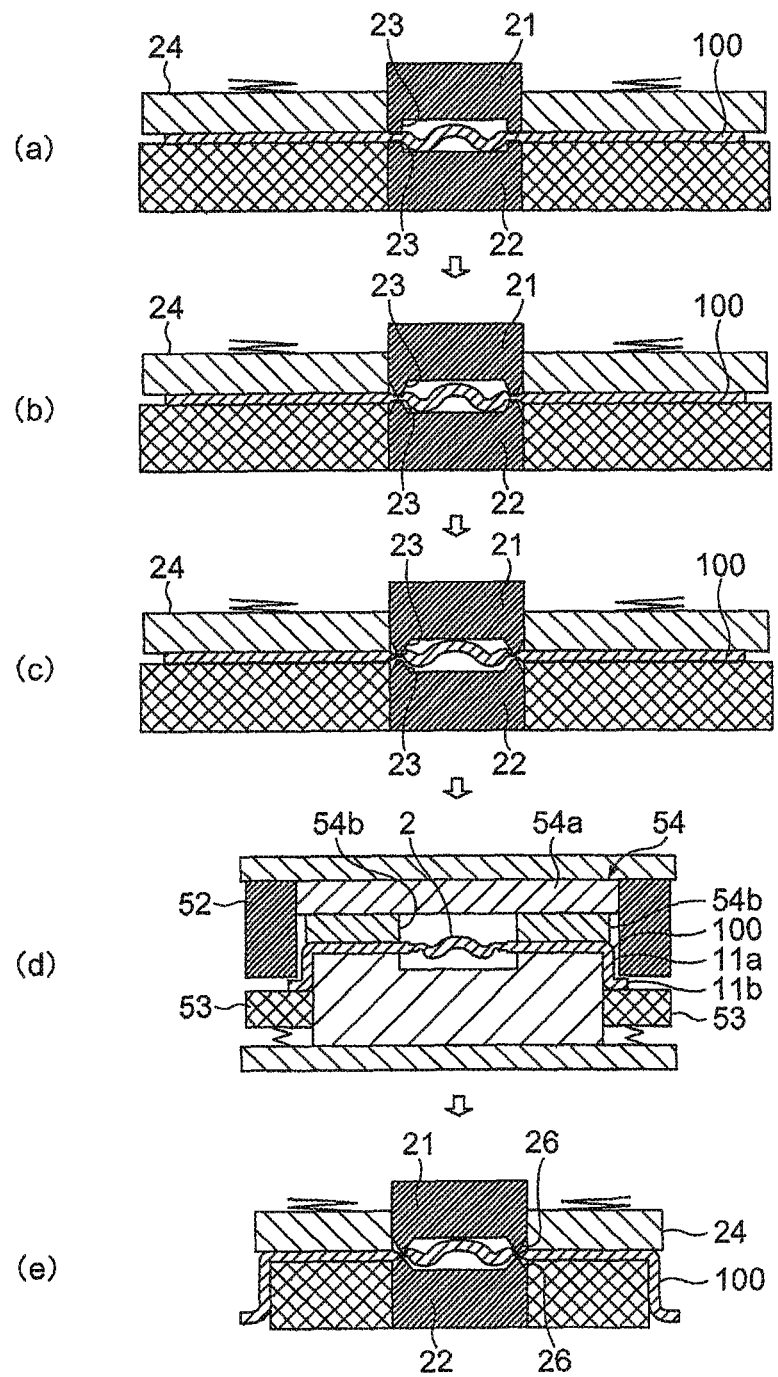
FIGS. 10(a)-10(e) are illustrative views showing a method for manufacturing a battery case lid according to a third embodiment of the present invention.

FIG. 10 is an illustrative view showing a method for manufacturing a battery case lid according to a third embodiment of the present invention. In the second embodiment, tensile stress acting on the thin annular portion 3 during the drawing process is reduced by implementing the drawing process on the metal sheet 100 in a condition where the outer peripheral side sheet surface 10 on the periphery of the thin annular portion 3 is restrained by the restraining means 54. It is however difficult to eliminate the action of the tensile stress on the thin annular portion 3 completely, and therefore the thickness of the thin annular portion 3 may be reduced by tensile stress. When the thickness of the thin annular portion 3 decreases below a predetermined thickness, the thin annular portion 3 ruptures before the internal pressure of the battery case reaches a pre-envisaged pressure.

Hence, whereas in the second embodiment the thickness of the thin annular portion 3 is reduced to the final target thickness in the coining process performed before the side wall forming process (see (a) to (d) of FIG. 9), in the third embodiment, the thickness of the thin annular portion 3 is kept thicker than the final target thickness in the coining process performed before the side wall forming process (see (a) of FIG. 10), and following the side wall forming process (see (d) of FIG. 10), the thickness of the thin annular portion 3 is reduced to the final target thickness by pressing an adjustment annular projecting portion 26 against the thin annular portion 3 (see (e) of FIG. 10). An equivalent member to the annular projecting portion used in the fourth stage of the coining process, shown in (d) of FIG. 9, is used as the adjustment annular projecting portion 26. Note that a pressing amount of this annular projecting portion is set in consideration of a thickness reduction obtained in the side wall forming process. All other configurations are similar to the second embodiment.

In this method for manufacturing a battery case lid, the thickness of the thin annular portion 3 is reduced to the final target thickness after the side wall forming process by pressing the adjustment annular projecting portion 26 against the thin annular portion 3. Therefore, the thin annular portion 3 can be formed while taking into consideration the thickness reduction obtained in the side wall forming process, and as a result, a precision of the thickness of the thin annular portion 3 can be improved. Hence, the precision of the operating pressure of the safety valve 2 can be improved, enabling an improvement in the operational reliability of the safety valve 2.

Note that in the second and third embodiments, the flange portion 12 is formed at an appropriate size by implementing the drawing process on the metal sheet 100. However, the size of the flange portion may be adjusted by implementing the drawing process on a larger metal sheet and then cutting way any surplus regions. In other words, the side wall forming process may further include a metal sheet trimming process.

Further, in the second and third embodiments, the thin annular portion is formed by simultaneously pressing the mutually opposing annular projecting portions 23 against the front and rear surfaces of the metal sheet 100, but the present invention is not limited thereto, and the thin annular portion may be formed by pressing an annular projecting portion against only one of the front and rear surfaces of the metal sheet.

The invention claimed is:

1. A method for manufacturing a battery safety valve wherein; a thin annular portion constituting an edge portion of a safety valve is formed in a stainless steel metal sheet constituting a battery case of a battery with the thin annular portion being thinner than the remainder of the metal sheet, by disposing the metal sheet between a plurality of sets of a punch and a die with the punch and the die of each set provided with matching annular projecting portions that are arranged to oppose each other, simultaneously pressing the annular projecting portions of a first one of the sets against respective surfaces of the metal sheet, wherein the annular projecting portions of the first set have a first predetermined tip shape that is the same and a first predetermined tip end width that is the same, and simultaneously pressing the annular projecting portions of a second one of the sets against the respective surfaces of the metal sheet, wherein the annular projecting portions of the second set have a second predetermined tip shape that is the same and a second predetermined tip end width that is the same, with the predetermined second tip end width being narrower than the predetermined first tip end width.

2. A method for manufacturing a battery safety valve according to claim 1 wherein, when the annular projecting portions are pressed against the respective surfaces of the metal sheet, the metal sheet is restrained by restraining means on an outer peripheral side of the annular projecting portions.

3. A method for manufacturing a battery safety valve according to claim 1 wherein, a crushing rate of the metal sheet during the respective pressing steps is set at no more than 70%.

4. An apparatus for manufacturing a battery safety valve including a thin annular portion constituting an edge portion of the safety valve that is formed on a stainless steel metal sheet constituting a battery case of a battery with the thin annular portion being thinner than the remainder of the metal sheet comprising:

a plurality of sets of a punch and a die with the punch and the die of each set provided with matching annular projecting portions that are arranged to oppose each other, a first one of the sets wherein the annular projecting portions of the punch and the die of the first set each have a predetermined first tip end shape that is the same and have a first predetermined tip end width that is the same;

a second one of the sets wherein the annular projecting portions of the second set have a predetermined second tip end shape that is the same and have a second tip end width that is the same, with the predetermined second tip end width being narrower than the predetermined first tip end width; and restraining means disposed on an outer peripheral side of the annular projecting portions of the punch and the die, the annular projecting portions being for forming the safety valve thin annular portion by simultaneously pressing the annular projecting portions of the first set against respective surfaces of the metal sheet followed by simultaneously pressing the annular projection portions of the second set against the respective surfaces of the metal sheet so that the first and second sets are sequentially utilized in descending order of the tip end width of the annular projecting portions with the first set utilized before the second set while restraining the metal sheet on the outer peripheral side of the annular projecting portions using the restraining means.

5. A method for manufacturing a battery case lid for manufacturing a battery case lid that includes a safety valve having an edge portion that is constituted by a thin annular portion, and a side wall portion that stands upright in an annular shape from an outer edge of an outer peripheral side sheet surface positioned on an outer peripheral side of the thin annular portion, the method comprising:

a coining step of forming the thin annular portion on a stainless steel metal sheet serving as a material of the lid by pressing annular projecting portions against the metal sheet with the thin annular portion being thinner than the remainder of the metal sheet; and a side wall forming step of forming the side wall portion on the metal sheet by implementing a drawing on the metal sheet after the coining step, wherein the thin annular portion is formed in the coining step by simultaneously pressing the annular projecting portions disposed to oppose each other, against front and rear surfaces of the metal sheet, wherein a thickness of the thin annular portion is kept thicker than a final target thickness in the coining step, and the thickness of the thin annular portion is reduced to the final target thickness after the side wall forming step by pressing an adjustment annular projecting portion against the thin annular portion.

6. A method for manufacturing a battery case lid according to claim 5 wherein, the drawing is performed during the side wall forming step in a condition where a sheet surface on a periphery of the thin annular portion is restrained by restraining means.

7. A method for manufacturing a battery case lid according to claim 5 wherein, multistage coining is performed in the coining step using a plurality of annular projecting portions having different tip end widths such that the annular projecting portions are pressed against the metal sheet in descending order of the tip end width.

8. A method for manufacturing a battery case lid according to claim 5, characterized in that at each stage of the coining step, a crushing rate of the metal sheet is set at no more than 70%.

9. The method of claim 1 further comprising simultaneously pressing the annular projecting portions of a third one of the sets against the respective surfaces of the metal sheet, wherein the annular projecting portions of the third set have a third predetermined tip shape that is the same and a third predetermined tip end width that is the same, with the third predetermined tip end width being narrower than the second predetermined tip end width.

10. The method of claim 9 further comprising simultaneously pressing the annular projection portions of a fourth one of the sets against the respective surfaces of the metal sheet, wherein the annular projecting portions of the fourth set have a fourth predetermined tip shape that is the same and a fourth predetermined tip end width that is the same, with the fourth predetermined tip end width being narrower than the third predetermined tip end width, the first through fourth sets being sequentially utilized in descending order of tip end width of the annular projecting portions so that the first set is utilized before the second set, the second set is utilized before the third set, and the third set is utilized before the fourth set.

* * * * *